United States Patent
Balogh

(10) Patent No.: US 8,129,959 B1
(45) Date of Patent: Mar. 6, 2012

(54) START-UP CIRCUITRY AND METHOD FOR POWER CONVERTER

(75) Inventor: Laszlo Balogh, Merrimack, NH (US)

(73) Assignee: Fairchild Semiconductor Corporation, South Portland, ME (US)

( * ) Notice: Subject to any disclaimer, the term of this patent is extended or adjusted under 35 U.S.C. 154(b) by 672 days.

(21) Appl. No.: 12/182,915

(22) Filed: Jul. 30, 2008

Related U.S. Application Data

(60) Provisional application No. 61/125,154, filed on Apr. 22, 2008.

(51) Int. Cl.
*G05F 1/10* (2006.01)

(52) U.S. Cl. ........................................... 323/222

(58) Field of Classification Search .......... 323/222–225, 323/268, 271, 282, 285, 288
See application file for complete search history.

(56) References Cited

U.S. PATENT DOCUMENTS 5,285,369 A    2/1994   Balakrishnan
(Continued)

*Primary Examiner* — Matthew Nguyen
(74) *Attorney, Agent, or Firm* — Sidley Austin LLP

(57) ABSTRACT

In one embodiment, circuitry is provided for startup of a power converter. The circuitry includes a bias capacitor operable to be charged for providing energy to a controller of the power converter. A divider circuit is coupled to a voltage source. Current flows through the divider circuit. A switch, coupled to the divider circuit, is operable to be turned on and off to divert current flow in the divider circuit for charging the bias capacitor. This provides energy to the controller of the power converter at startup without employing an external bias source or high value bleeder resistor.

21 Claims, 2 Drawing Sheets

U.S. PATENT DOCUMENTS

| | | | |
|---|---|---|---|
| 6,204,644 B1 * | 3/2001 | Otake | 323/222 |
| 6,208,123 B1 * | 3/2001 | Sudo | 323/280 |
| 6,972,971 B2 | 12/2005 | Jang et al. | |
| 7,642,760 B2 * | 1/2010 | Takeyama | 323/271 |
| 7,723,972 B1 * | 5/2010 | Balogh | 323/282 |

* cited by examiner

START-UP CIRCUITRY AND METHOD FOR POWER CONVERTER

CROSS-REFERENCE TO RELATED APPLICATION AND CLAIM OF PRIORITY

The present application claims the benefit of priority to U.S. Provisional Patent Application Ser. No. 61/125,154, filed Apr. 22, 2008, entitled, "Start-Up Circuitry and Method for Power Converter," the entirety of which is incorporated by reference herein.

BACKGROUND

1. Field of Invention

The present invention relates to power converters, and more particularly, to start-up circuitry and method for a power converter.

2. Description of Related Art

Power converters are essential for many modern electronic devices. Among other capabilities, a power converter can adjust voltage level downward (buck converter and its derivatives) or adjust voltage level upward (boost converter and its derivatives). A power converter may also convert from alternating current (AC) power to direct current (DC) power, or vice versa. A power converter may also function to provide an output at a regulated level (e.g., 5.0V). Power converters are typically implemented using one or more switching devices, such as transistors, which are turned on and off to deliver power to the output of the converter. Control circuitry is provided to regulate the turning on and off of the switching devices, and thus, these converters are known as "switching regulators" or "switching converters." Such a power converter may be incorporated into or used to implement a power supply—i.e., a switching mode power supply (SMPS). The power converters may also include one or more capacitors or inductors for alternately storing and outputting energy.

Some power converters may employ a startup circuit in order to begin operation after power on. According to previous designs, one kind of startup circuit provides bias power for a controller by charging up a bias capacitor through a high value ("bleeder") resistor coupled directly between a line voltage and the bias capacitor. The bias capacitor is charged to a voltage level above the under voltage lock out (UVLO) threshold of the controller so that the power converter can begin switching of the switching devices.

Such previous designs are problematic. Even after the high value resistor has served its function during startup, the resistor continuous to cause power loss in the power converter. Thus, during standby or normal operation, the bleeder resistor decreases efficiency. Furthermore, because of safety regulations, the bleeder resistor is typically implemented using two or three discrete resistors. Each such resistor is another part that must be included in implementation for the power converter, thereby increasing the bill of materials (BOM) part count.

SUMMARY

Briefly and generally, embodiments of the invention include startup circuitry and method for a power converter (e.g., employing a pulse width modulation (PWM) controller) without an external bias source or high value bleeder resistor using an existing voltage divider circuitry (e.g., either feedback or AC sense) to charge a startup capacitor.

According to one embodiment, circuitry is provided for startup of a power converter. The circuitry includes a bias capacitor operable to be charged for providing energy to a controller of the power converter. A divider circuit is coupled to a voltage source. Current flows through the divider circuit. A switch, coupled to the divider circuit, is operable to be turned on and off to divert current flow in the divider circuit for charging the bias capacitor. This provides energy to the controller of the power converter at startup without employing an external bias source or high value bleeder resistor.

According to another embodiment of the present invention, a method is provided for startup of a power converter. The method includes the following: providing a bias capacitor operable to be charged for providing energy to a controller of the power converter; providing current through a divider circuit coupled to a voltage source; and diverting the current flow in the divider circuit for charging the bias capacitor, thereby providing energy to the controller of the power converter at startup without employing an external bias source or high value bleeder resistor.

Important technical advantages of the present invention are readily apparent to one skilled in the art from the following figures and descriptions.

BRIEF DESCRIPTION OF DRAWINGS

For a more complete understanding of the present invention and for further features and advantages, reference is now made to the following description taken in conjunction with the accompanying drawings.

DETAILED DESCRIPTION

Figure 1:
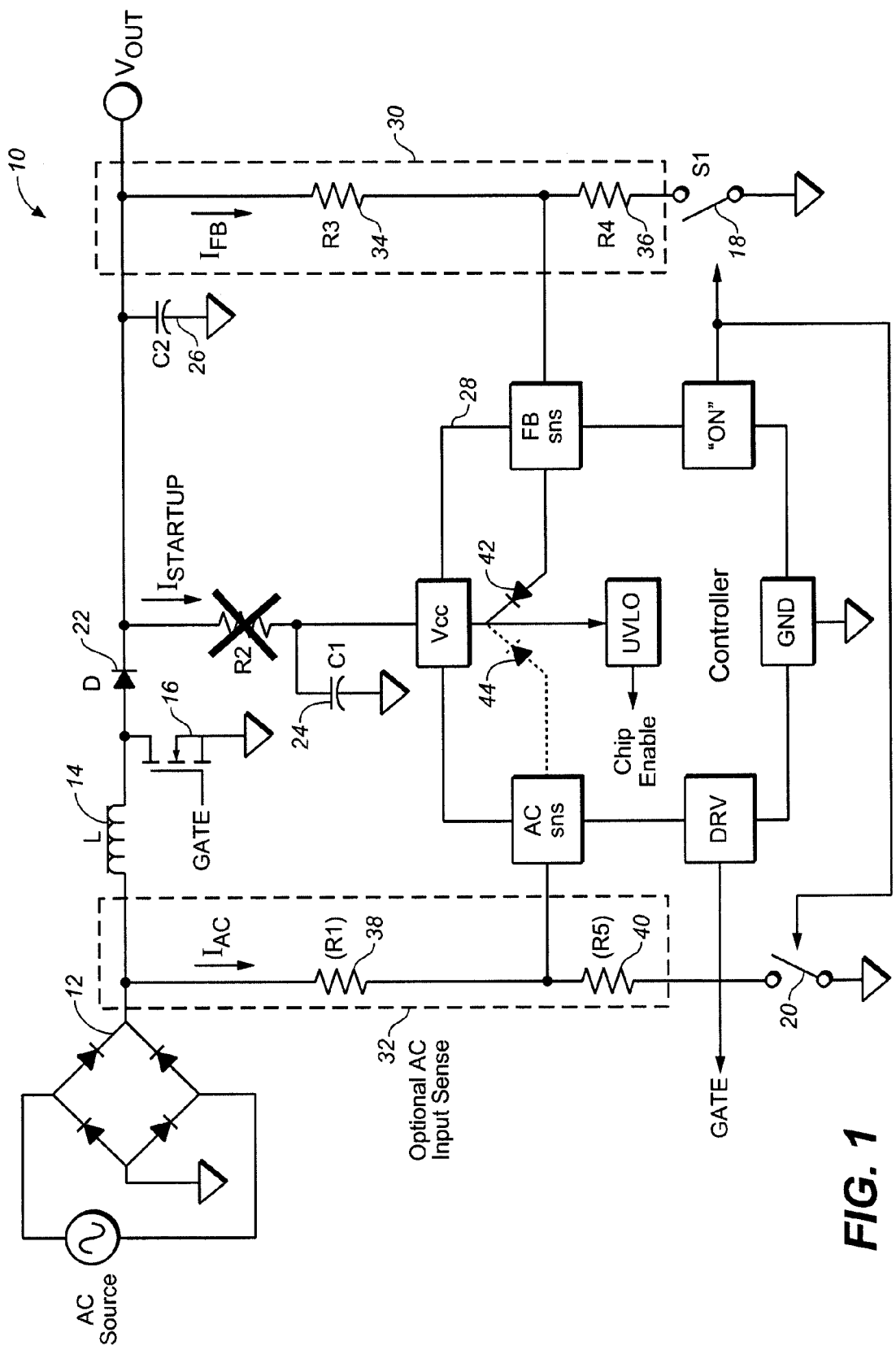
FIG. 1 is a schematic block diagram of an exemplary implementation of a power converter system with start-up circuitry, according to an embodiment of the invention.
Figure 2:
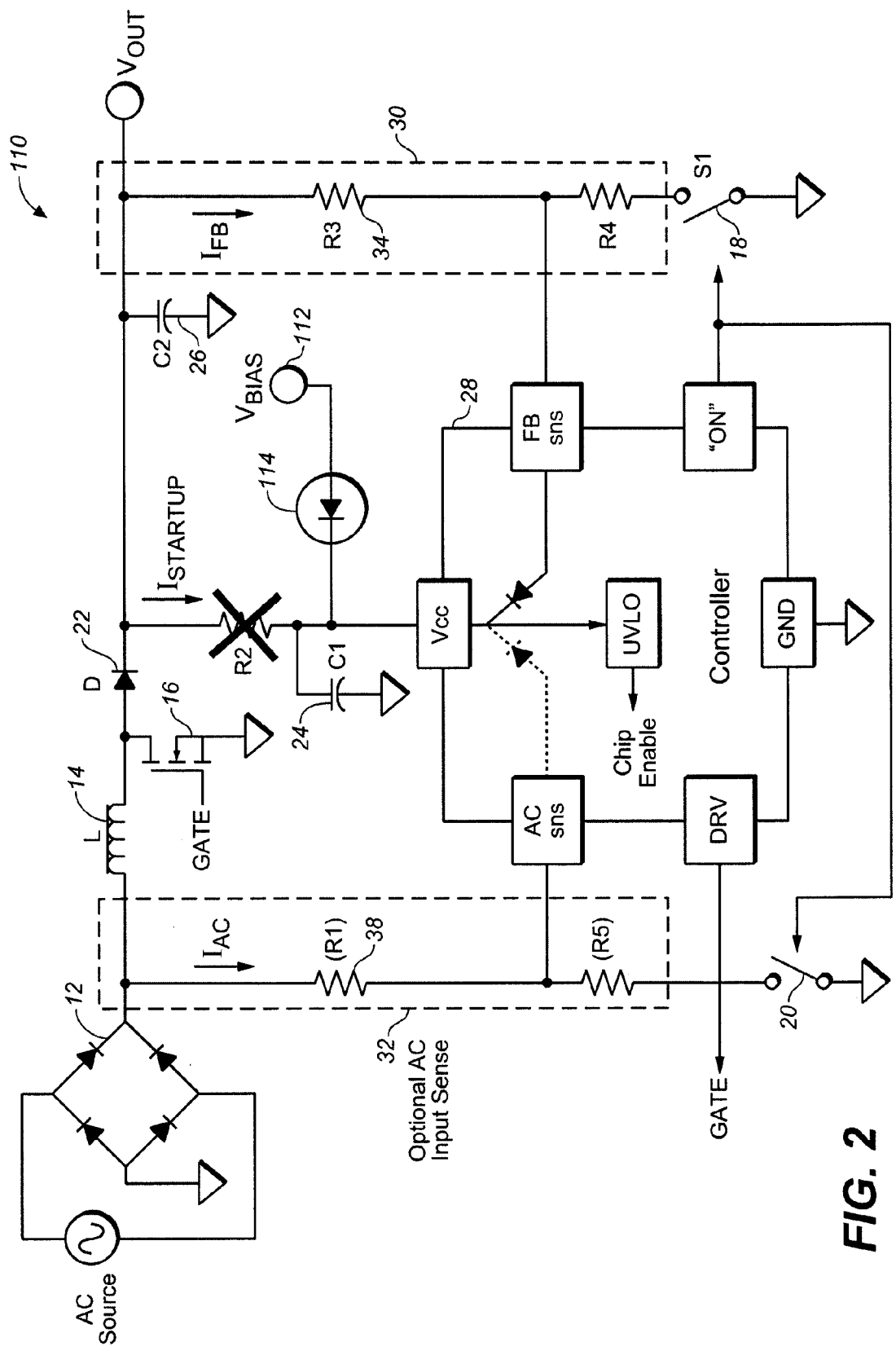
FIG. 2 is a schematic block diagram of another exemplary implementation of a power converter system with start-up circuitry, according to an embodiment of the invention.

Embodiments of the present invention and their advantages are best understood by referring to FIGS. 1 and 2 of the drawings. Like numerals are used for like and corresponding parts of the various drawings.

In various embodiments, the present invention provides a more efficient solution, using fewer parts, to deliver the initial charge for bias energy storage capacitor of a controller (such as a pulse width modulation (PWM) controller) in a power supply.

FIG. 1 is a schematic block diagram of an exemplary implementation of a power converter system 10 with start-up circuitry, according to an embodiment of the invention. Such power converter system 10 can be a switching regulator. Power converter system 10 can convert an alternating current (AC) power to direct current (DC) power, and thus, is an AC-to-DC converter. Power converter 10 receives an AC input voltage from an AC power source and provides DC power to a load at an output terminal Vout. Power converter system 10 may also provide or support power factor correction (PFC).

As shown, power converter system 10 includes a rectifier circuit 12, inductor 14, switching device 16, switches 18, 20, diode 22, capacitors 24, 26, controller 28, feedback circuit 30 and (optional) AC input sense circuit 32. In some embodiments, all or a portion of the components of power converter system 10 can be implemented on a single or multiple semiconductor dies (commonly referred to as a "chip") or discrete components. Each die is a monolithic structure formed from, for example, silicon or other suitable material. For implementations using multiple dies or components, the dies and components can be assembled on a printed circuit board (PCB) having various traces for conveying signals there between. In one embodiment, for example, controller 28 can be provided on a single chip or die, or on one or more separate die, and the remaining components are implemented as discrete components or on other die.

The rectifier circuit 12 rectifies the AC input voltage to create a DC line voltage. In one embodiment, the rectifier 12 can be implemented with a plurality of diodes, as understood by one of ordinary skill in the art. The inductor 14 and diode 22 are connected between rectifier circuit 12 and the output terminal Vout. As used herein, the terms or "connected" or "coupled," or any variant thereof, covers any connection or coupling, either direct or indirect, between two or more elements.

Switching device 16 may be implemented as a metal-oxide-semiconductor field effect transistor (MOSFET), but it is understood that such switch can be implemented with other suitable devices such as, for example, insulated gate bipolar transistors (IGBTs), insulated gate field effect transistors (IGFETs), bipolar junction transistors (BJTs), etc. Switching device 16 is turned on and off for power factor correction (PFC) and output voltage regulation. Capacitor 26 filters and smooths the rectified current pulses to form a substantially direct current output voltage Vout at the output terminal.

Feedback circuit 30 is coupled to the output terminal and provides a feedback signal which is indicative or representative of the value of the output voltage Vout. As shown, feedback circuit 30 may be implemented as a resistor divider circuit comprising resistors 34, 36.

AC input sense circuit 32 is optional, and thus, in some embodiments, is not provided. AC input sense circuit 32 is coupled to the rectifier circuit 12 and provides an AC sense signal which is indicative or representative of the value of the AC input for power converter system 10. Like feedback circuit 30, AC input sense circuit 32 may be implemented as a resistor divider circuit, for example, comprising resistors 38, 40.

Controller 28 generates a control signal which is provided to the control terminal of switching device 16 for turning on and off the switch for power factor correction (PFC) and output voltage regulation. In some embodiments, for output voltage regulation, the control signal can be a pulse width modulation (PWM) control signal. Controller 28 outputs the control signal at a terminal or pin DRV, which can be coupled to the control terminal of switching device 16. Controller 28 is coupled to the feedback circuit 30 and AC input sense circuit 32 at terminals or pins FB sns and AC sns, and receives the respective feedback and AC sense signals therefrom. The respective signals are used in controlling the switching device 16. Controller 28 may have an under voltage lock out (UVLO) circuit, which prevents the controller 28 from providing control signaling to switch 16 until some minimum voltage threshold for supply Vcc has been reached.

Capacitor 24 is coupled to a supply terminal Vcc for controller 28 and provides energy for controller 28 after the capacitor 24 has been charged up to the UVLO turn-on threshold (typically 12V to 15V) for the controller.

Start-up circuitry, according to embodiments of the present invention, provides or delivers an initial charge for bias energy storage capacitor 24 of controller 28 in power converter system 10. In one embodiment, the start-up circuitry uses current from a high voltage divider circuit already existing in some power converter systems, such as the feedback circuit 30 or AC input sense circuit 32, to charge the bias capacitor 24 and to provide power to the controller 28 until the UVLO turn-on threshold is reached. The controller's power consumption in UVLO is much less than in normal operation. As such, the power for controller 28 can be supplied through large value resistors, such as resistor 34 of the feedback circuit 30 or resistor 38 of AC input sense circuit 32. As shown, the start-up circuitry can be implemented using one or more diodes 42, 44 which direct and allow current to flow from the feedback circuit 30 or AC input sense circuit 32 to the bias capacitor 24. Diode 42 is coupled between the pins FB sns and Vcc of controller 28, while diode 44 is coupled between the pins AC sns and Vcc. In some embodiments, diodes 42, 44 may be implemented in or are internal to controller 28.

The start-up circuitry may also include switches 18 and 20, which are coupled to the feedback circuit 30 and AC input sense circuit 32, respectively, and may be controlled with signals from controller 28. Switches 18 and 20 function to divert or interrupt current flow in feedback circuit 30 or AC input sense circuit 32, respectively. Each of switches 18, 20 can be implemented with an inexpensive, low voltage, small signal transistor or any other means to interrupt the current flowing through the resistor networks of feedback circuit 30 or AC input sense circuit 32.

In operation, in one embodiment, at start-up of power converter system 10, energy is provided to controller 28 through resistor 34 of the feedback circuit 30 or resistor 38 of AC input sense circuit 32. Some of this energy is consumed by the controller 28. The energy consumed by controller 28 can be a relatively small portion (e.g., 80 uA) since the controller 28 is in UVLO. Most of the remainder of the energy provided through resistor 34 of the feedback circuit 30 or resistor 38 of AC input sense circuit 32 is used to charge the capacitor 24 coupled to the supply terminal Vcc. Thus, at start-up, the capacitor 24 does not provide energy for the controller 28; instead, capacitor 24 is charged up so that it will later provide energy to power the controller 28. To accomplish this, switch 18 and switch 20 are open (turned-off) so that current is diverted to controller 28, and then on to bias capacitor 24 through diodes 42 and 44.

Once capacitor 24 is charged up to the UVLO turn-on threshold (typically 12V to 15V), the controller 28 enters normal operation (e.g., Icc=2-4 mA). At that point, resistor 34 of the feedback circuit 30 or resistor 38 of AC input sense circuit 32 can not provide sufficient bias current to power controller 28. So, instead, the energy stored in capacitor 24 is now used to provide power to the controller 28 until switching commences.

Note that when switches 18 and 20 are open, the resistors 34 and 38 of feedback circuit 30 and AC input sense circuit 32 are used exactly the same way as a bleeder resistor in previous designs. With respect to resistor 34, one terminal of the resistor is connected to output voltage and the other terminal is connected to the bias capacitor. Although diode 42 is in the path for current charging bias capacitor 24, for all practical purposes, the forward voltage drop of the diode 42 is negligible compared to the voltage difference between the output voltage and the voltage on the VCC pin. Therefore, the diode 42 has minimal effect on the charging of bias capacitor 24.

During normal operation of the controller 28, the voltage divider circuit formed by resistors 34, 36 must represent the output voltage at the FB pin of the controller 28. Therefore, once the UVLO threshold is reached, switch 18 is closed (e.g., turned on) before the controller 28 is allowed to be fully functional (i.e. start switching). When the switch 18 is closed, current is able to flow through resistor 36 of the feedback circuit, thus causing the voltage of the FB pin to fall significantly lower than the voltage at the VCC pin. The diode 42 becomes reverse biased, and separates the bias and feedback functions of the controller 28.

Likewise, when the voltage on capacitor 24 reaches the UVLO threshold of the controller 28, switch 20 is closed, and current is able to flow through resistor 40 of the AC input sense circuit 32. This causes the voltage of the AC sns pin to fall significantly lower than the voltage at the VCC pin so that current no longer flows from the AC input sense circuit 32 to charge the capacitor 24. The diode 44 becomes reverse biased.

In other embodiments of the present invention, any other high voltage divider already present in a power converter system can be utilized (in addition to or instead of the feedback circuit 30 or AC input sense circuit 32) for providing power to the controller 28 and charging bias capacitor 28.

A technical advantage of embodiments of the present invention includes eliminating the bleeder resistor that, in previous designs, is connected between the DC line voltage and the bias capacitor and used for charging the bias capacitor. In previous designs, current flows through the bleeder resistor continuously throughout operation, even after start up. As such, the bleeder resistor causes continuous power loss in the power converter, thereby reducing efficiency. By eliminating the bleeder resistor, embodiments of the present invention lower BOM part count and improve operating efficiency for power converter systems in which they are utilized. Significant improvement in power consumption will be gained during standby operation.

Another technical advantage of embodiments of the present invention includes providing additional protection against catastrophic over voltage of the boosted output voltage Vout. This is realized since the power factor correction (PFC) circuitry cannot start up without a feedback divider. With embodiments of the present invention, the feedback voltage divider is needed to provide start-up power for the controller.

In some embodiments, the FB sns pin of the controller 28 should be designed to withstand a higher voltage (i.e., minimum is UVLO threshold+Vbe), but there is no penalty on the common mode range because the operating voltage range is the same as before (without using this invention).

Controller 28 provides a control signal (or a pin with an open collector output) to implement the control for switches 18, 20. In most controllers with more than 8 pins or terminals, there is an existing 5V rail which can be switched by the UVLO circuit. With such controllers, the overhead to implement embodiment of this invention is relatively minimal.

FIG. 2 is a schematic block diagram of another exemplary implementation of a power converter system 110 with start-up circuitry, according to an embodiment of the invention. Power converter system 110 of FIG. 2 is substantially similar to power converter system 10 of FIG. 1. Like system 10, system 110 can be a switching regulator (e.g., AC-to-DC converter) and includes a rectifier circuit 12, inductor 14, switching device 16, switches 18, 20, diode 22, capacitors 24, 26, controller 28, feedback circuit 30 and (optional) AC input sense circuit 32.

Power converter system 110 includes or can be connected to an independent bias regulator source (Vbias) 112 for charging the bias capacitor 24 to the UVLO threshold. The bias regulator source 112 can provide a voltage bias of, for example, 12V for a UVLO of 15V. Because the bias regulator source 112 has a bias value below the UVLO threshold, the bias regulator source 112 acting alone would not allow the controller 28 to move into normal operation. For example, a 12V rail (of the bias regulator source 112) can not raise VCC above the 15V turn-on threshold. The diode 114 connected between bias regulator source 112 and the VCC pin of controller 28 allows resistors 34 and 38 to charge the capacitor above the 12V bias rail according to the techniques described above. The diode 114 becomes reverse biased so the high value resistors 34, 38 only deliver power to capacitor 24 and the controller 28 (80 uA). After the controller 28 starts normal operation, the voltage on capacitor 28 falls and diode 114 becomes forward biased and powers the controller from the 12V rail.

In such applications with an independent bias regulator, the bias voltage can be used even if the UVLO turn-on threshold is much higher, which is a technical advantage.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. Circuitry for startup of a power converter, the circuitry comprising:
 a bias capacitor operable to be charged for providing energy to a controller of the power converter;
 a divider circuit coupled to a voltage source and through which current flows; and
 a switch coupled to the divider circuit, the switch operable to be turned on and off to divert current flow in the divider circuit for charging the bias capacitor, thereby providing energy to the controller of the power converter at startup without employing an external bias source or high value bleeder resistor.

2. The circuitry of claim 1 wherein the divider circuit is used for feedback in the power converter.

3. The circuitry of claim 2 wherein the divider circuit is coupled to an output terminal at which the output voltage of the power converter is provided.

4. The circuitry of claim 1 wherein the divider circuit is used for AC input sense in the power converter.

5. The circuitry of claim 4 wherein the divider circuit is coupled to a DC line voltage in the power converter.

6. The circuitry of claim 1 comprising a diode coupled between the switch and the bias capacitor, the diode operable to direct current flow from the divider circuit to the bias capacitor.

7. A method for startup of a power converter, the method comprising:
 providing a bias capacitor operable to be charged for providing energy to a controller of the power converter;
 providing current through a divider circuit coupled to a voltage source; and
 diverting the current flow in the divider circuit for charging the bias capacitor, thereby providing energy to the controller of the power converter at startup without employing an external bias source or high value bleeder resistor.

8. The method of claim 7 wherein the divider circuit is used for feedback in the power converter.

9. The method of claim 8 wherein the divider circuit is coupled to an output terminal at which the output voltage of the power converter is provided.

10. The method of claim 7 wherein the divider circuit is used for AC input sense in the power converter.

11. The method of claim 10 wherein the divider circuit is coupled to a DC line voltage in the power converter.

12. The method of claim 7 comprising direct current flow from the divider circuit to the bias capacitor using a diode coupled between the switch and the bias capacitor.

13. A power converter comprising:
an input terminal for receiving an input voltage;
an output terminal at which an output voltage of the power converter is provided; and
circuitry for startup of the power converter, the startup circuitry comprising:
a bias capacitor operable to be charged for providing energy to a controller of the power converter;
a divider circuit coupled to a voltage source and through which current flows; and
a switch coupled to the divider circuit, the switch operable to be turned on and off to divert current flow in the divider circuit for charging the bias capacitor, thereby providing energy to the controller of the power converter at startup without employing an external bias source or high value bleeder resistor.

14. The power converter of claim 13 wherein the divider circuit is used for feedback in the power converter.

15. The power converter of claim 14 wherein the divider circuit is coupled to the output terminal at which the output voltage of the power converter is provided.

16. The power converter of claim 13 wherein the divider circuit is used for AC input sense in the power converter.

17. The power converter of claim 16 wherein the divider circuit is coupled to the DC line voltage in the power converter.

18. The power converter of claim 13 comprising a diode coupled between the switch and the bias capacitor, the diode operable to direct current flow from the divider circuit to the bias capacitor.

19. The power converter of claim 13 where the input voltage is an AC input voltage.

20. The power converter of claim 19 comprising a rectifier circuitry coupled to the input terminal, the rectifier circuitry operable to rectify the AC input voltage to provide a DC line voltage.

21. The power converter of claim 20 wherein the divider circuit is used for AC input sense in the power converter.

* * * * *